US012697615B2

(12) United States Patent
Hayman et al.

(10) Patent No.: US 12,697,615 B2
(45) Date of Patent: Aug. 4, 2026

(54) PORTABLE SYSTEM, METHOD AND KIT FOR ONSITE ADSORBENT EVALUATION

(71) Applicant: The United States of America, as Represented by the Secretary of the Navy, Arlington, VA (US)

(72) Inventors: Nicholas T. Hayman, San Diego, CA (US); Jessica E. Carilli, Encinitas, CA (US); Lewis Hsu, Aiea, HI (US); Robert D. George, Chula Vista, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 494 days.

(21) Appl. No.: 18/496,861

(22) Filed: Oct. 28, 2023

(65) Prior Publication Data

US 2024/0408592 A1 Dec. 12, 2024

Related U.S. Application Data

(60) Provisional application No. 63/506,553, filed on Jun. 6, 2023.

(51) Int. Cl.
*B01L 3/00* (2006.01)

(52) U.S. Cl.
CPC ....... *B01L 3/502715* (2013.01); *B01L 3/5023* (2013.01); *B01L 2300/0681* (2013.01);
(Continued)

(58) Field of Classification Search
CPC ....... B01L 2300/0681; B01L 2300/069; B01L 2400/0487; B01L 2400/0622;
(Continued)

(56) References Cited

U.S. PATENT DOCUMENTS

| | | | |
|---|---|---|---|
| 2014/0034578 | A1 | 2/2014 | Abulencia et al. |
| 2020/0316560 | A1 | 10/2020 | Distefano et al. |

(Continued)

OTHER PUBLICATIONS

Kólová et al., "A Review Article of Rapid Small-Scale col. Tests", Water Management Technical and Economical Information Journal, vol. 64, No. 4, p. 41-45, 2022.

(Continued)

*Primary Examiner* — Jennifer Wecker
*Assistant Examiner* — Jonathan Bortoli
(74) *Attorney, Agent, or Firm* — Naval Information Warfare Center, Pacific; Kyle Eppele; Paul C. Oestreich

(57) ABSTRACT

Embodiments of the invention include a portable system, method and kit for onsite adsorbent evaluation useful for quickly testing adsorbents used to remove unwanted contaminants from water sources, including ground water. The embodiments of the portable system, method and kit of the present invention may be used in remote locations including the location of the source water obviating the need for transporting contaminated water or performing sampling in a laboratory. Components of the system may include a plurality of fluid channels or paths. Each fluid path may or may not include a column containing the adsorbent under evaluation, passive sampler, sampling vessel, source tubing, treated water return tubing, taps at junctions and a pump to draw source water through the fluid path in the system.

22 Claims, 6 Drawing Sheets

(52) U.S. Cl.
CPC . *B01L 2300/069* (2013.01); *B01L 2400/0487* (2013.01); *B01L 2400/0622* (2013.01)

(58) Field of Classification Search
CPC .. B01L 3/5023; B01L 3/502715; C02F 1/008; C02F 1/283; C02F 1/42; G01N 33/18
See application file for complete search history.

(56) References Cited

U.S. PATENT DOCUMENTS

2021/0047220 A1 * 2/2021 Goodrich ............... A01N 25/08
2022/0017386 A1 1/2022 Distefano

OTHER PUBLICATIONS

"Standard Practice for the Prediction of Contaminant Adsorption on GAC in Aqueous Systems Using Rapid Small-Scale col. Tests", ASTM International—ASTM D6586-03(2021).

Crittenden et al., "Predicting GAC Performance with Rapid Small-Scale col. Tests" Research and Technology, Journal AWWA, pp. 77-87, Jan. 1991.

"Testing and Modeling Capabilities for Contaminants Including PFAS", Evoqua Water Technologies, <https://www.evoqua.com/en/evoqua/products--services>.

"Reglo ICC Operating Manual", Cole-Parmer, Rev. C, 14-036-E, pp. 1-36, 2015.

Thompson, "Rapid Small-Scale col. Test Development for Evaluating Excess Fluoride Removal from Drinking Water using Bone-Char Sorbents", MS Thesis, NC State Univ., 2020.

Schaefer et al., "Assessing Rapid Small-Scale col. Tests for Treatment of Perfluoroalkyl Acids by Anion Exchange Resin", Ind. Eng. Chem. Res. 2019, 58, pp. 9701-9706.

Schaefer et al., "Application of Rapid Small-Scale col. Tests for Treatment of Perfluoroalkyl Acids Using Anion-Exchange . . . ", Ind. Eng. Chem. Res. 2020, 59, pp. 16832-16837.

"Passive Sampling", Wikipedia, <https://en.wikipedia.org/wiki/Passive_sampling>.

* cited by examiner

300

PORTABLE SYSTEM, METHOD AND KIT FOR ONSITE ADSORBENT EVALUATION

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice: (619) 553-5118; email: NIWC_Pacific_T2@navy.mil. Reference Navy Case Number 211439.

CROSS-REFERENCE TO RELATED APPLICATIONS

Pursuant to 35 U.S.C. § 119(e), this US non-provisional patent application claims benefit and priority to U.S. provisional patent application No. 63,506,553 filed on Jun. 6, 2023, titled "PORTABLE SYSTEM, METHOD AND KIT FOR RAPID ONSITE ADSORBENT EVALUATION", the contents of which are incorporated by reference in its entirety as if fully set forth herein and for all purposes.

BACKGROUND OF THE INVENTION

Field of the Invention: The present invention relates generally to mitigating the effects of groundwater pollution. More particularly, the present invention relates to systems and methods for evaluating adsorbent efficacy in removing pollutants from contaminated water. Still more particularly, the present invention relates to systems, methods and kits for onsite adsorbent evaluation.

Description of Related Art: Groundwater will normally look clear and clean because the ground naturally filters out particulate matter. But, natural and human-induced chemicals can be found in groundwater. Industrial discharges, urban activities, agriculture, groundwater pumpage and disposal of waste all can affect groundwater quality. Pesticides and fertilizers applied to lawns and crops can accumulate and migrate to the water table. Leakage from septic tanks and/or waste-disposal sites also can introduce bacteria to the water. Pesticides and fertilizers that seep into farmed soil can eventually end up in water drawn from a well.

Per- and polyfluoroalkyl substances (PFAS) are a family of thousands of different chemicals used in many consumer products to prevent stains, and repel water, oil and grease. Commercial and consumer products containing or degrading to these compounds were first introduced in the 1950s. They were used in a variety of products such as for the treatment of upholstered furniture fabric and carpets, in nonstick cookware, floor wax, the lining of food containers/packaging and firefighting foam. PFAS are now present virtually everywhere in the world because of the large amounts that have been manufactured and used by international consumers and industry. Once these compounds are released to the environment, they break down very slowly.

PFAS are chemicals of emerging concern, which have no Safe Drinking Water Act regulatory standards or routine water quality testing requirements. The Environmental Protection Agency (EPA) is currently studying PFAS to determine if national regulation is needed. Studies by the EPA, the Agency for Toxic Substances and Disease Registry (ATSDR), and others indicate that exposure to PFAS may cause elevated serum cholesterol levels and developmental effects to fetuses during pregnancy (e.g., low birth weight, accelerated puberty, skeletal variations) or to breastfed infants. Individual states are also conducting their own evaluations and may establish their own drinking water standards or environmental cleanup requirements. In June 2022 the EPA also updated a lifetime health advisory for two commonly used and studied PFAS, perfluorooctanoic acid (PFOA) and perfluorooctane sulfonate (PFOS) in addition to issuing values for perfluorobutane sulfonate (PFBS) and GenX PFAS compounds. The EPA's lifetime health advisories are non-enforceable and non-regulatory and are established to provide people, including the most sensitive populations, with a margin of protection from a lifetime exposure to PFOS and PFOA from drinking water.

The US Navy is taking active measures to mitigate groundwater contamination. For example, under the Navy Environmental Restoration Program, the Navy has developed a proactive policy to address past releases of PFAS, into the environment, particularly in the use of firefighting foam (specifically aqueous film forming foam or AFFF) to testing, training, firefighting, fire suppression systems and other life-saving emergency responses. Additionally, Navy plating shops used PFAS formulations to suppress the airborne release of toxic metallic vapors.

One of the first steps in mitigating groundwater contamination is testing of the groundwater to identify contaminants and their concentrations. The Navy has established long-term groundwater testing and monitoring plans in place at various Navy installations as well as for sampling residences, businesses, schools and clinics served by impacted water systems. Once particular contaminants have been identified, the problem shifts to identifying ways of removing those contaminants from the water source.

Adsorptive media (adsorbent), filtration and other systems are typically used to remove particular contaminants from water. The particular adsorbent selected must be matched to the particular contaminant being removed. That is to say that the adsorbent must have an acceptable efficacy in removing the contaminant from the water source of concern. While it may be impossible to remove all contaminants from a particular water source, the reduction of such contaminants below established safety thresholds is the goal for water treatment systems. Thus, the selection of particular adsorbents for a particular contaminant is perhaps the most important aspect when incorporating adsorption technology into the operation of a drinking water purification plant or wastewater treatment plant.

Water treatment can be challenging and complex. Treatment objectives vary from site to site. Changes in the influent water quality can require modifications to treatment processes. New regulatory limits may require completely new treatment technologies. The design and implementation of a water treatment system typically begins with laboratory-scale studies of adsorbents followed by pilot-scale studies at the contaminated site (field testing) and then finally full-scale, or commercial water treatment systems. Thus, the success of a commercial-scale water treatment system relies on scaling up from a laboratory environment.

Column testing in a laboratory environment generally involves passing the source water of concern (test water) through a borosilicate glass column containing a candidate adsorbent material which is typically surrounded on top and bottom by layers of glass beads (or fine sand) and glass wool (or a membrane polytetrafluoroethylene (PFTE) filter) to hold the adsorbent in place within the glass column. When using test water from an actual site of concern, it is generally filtered to remove undissolved substances in order to avoid clogging of the adsorbent in the column. Column dimensions vary, for example, inside diameter ranges from 6-76 mm and column height ranges from 100-750 mm. Other necessary equipment may include suitable column closures, hoses for conducting the test water into the column, throttle clamps for regulating the outflow from the column and a stand for the entire apparatus.

Rapid Small-Scale Column Tests (RSSCTs) can be used for quick and simple laboratory verification of the adsorption efficiencies of micropollutants on various adsorbents. A RSSCT, like a full-scale column test, is typically carried out at laboratory-scale which minimizes costs for materials and operation. RSSCTs are advantageous for minimizing time and economic demands compared to pilot or field tests. In contrast to a RSSCT, a pilot test is generally performed at the site of interest and testing usually takes place over a long period of time.

A RSSCT examines the adsorption of micropollutants on a selected adsorbent. Granular activated carbon (GAC) is the most commonly used type of adsorbent. However, other types of adsorbents can be used in a RSSCT. The principle of the test methodology is the flow rate of the test water through a small column filled with adsorbent, which allows more representative data to be obtained than in batch tests, see e.g., M. Poddar, "A Review on the Use of Rapid Small Scale Column Test (RSSCT) on Predicting Adsorption of Various Contaminants", IOSR Journal of Environmental Science, Toxicology and Food Technology [on-line], 2013, 3(1), pp. 77-85 ISSN 23192399, 23192402. The use of a RSSCT significantly reduces the amount of material required for construction of the columns, amount of adsorbent, volume of water and test operating time, see e.g., H. H. Salih, C. L. Patterson and G. A. Sorial, "Comparative Study on the Implication of Three Nanoparticles on the Removal of Trichloroethylene by Adsorption—Pilot and Rapid Small-Scale Column Tests", Water, Air, & Soil Pollution [on-line], 2013, 224(2), 1402, ISSN 0049-6979, 1573-2932. The information gained from RSSCT studies provides comparisons between different types of adsorbent media and to provide design parameters that can be used in design of larger pilot or full-scale treatment systems.

Determination of adsorbent performance has been largely limited to laboratories because of the need to tightly control experimental conditions and convenience of support utilities. Because RSSCT studies generally involve setups requiring a lot of attention, laboratory settings are generally preferred so that adequate facility support can be provided. However, laboratory setups often utilize synthetic water or deionized water spiked with a pollutant to understand the adsorption process. It is uncommon for an RSSCT experiment to use real water from a polluted site due to the logistics required to support a full length experiment. This would require large amounts of potentially hazardous liquid be transported to a laboratory for testing and disposed of during the experiment. In addition, even if site water is used for laboratory column testing, this will only provide results for a static concentrations of pollutants in the water, whereas in natural groundwater systems, these concentrations may vary over time. For these reasons, laboratory-based column testing has shortcomings.

In view of the foregoing and for other reasons that will become more clear, there exists a need in the art for improved systems, kits and methods for performing adsorbent evaluation, particularly onsite rather than just in a laboratory.

SUMMARY OF THE INVENTION

An embodiment of a portable onsite adsorbent evaluation system for sampling source water containing a target contaminant is disclosed. The system may include an equipment case for enclosing the system and protecting contents of the system therein during transportation and storage. The system may further include source tubing configured for siphoning the source water onsite into a fluid channel in the system. The system may further include a column disposed within the fluid channel and configured to receive the source water, the column configured with a candidate adsorbent, the candidate adsorbent configured for adsorbing the target contaminant from the source water to obtain column treated water. The system may further include a valve configured for selectively directing the column treated water to a sampling vessel. The system may further include return tubing along the fluid channel for selectively returning column treated source water to a waste container. The system may further include a pump configured for drawing the source water through the fluid channel beginning from source tubing and delivering column treated water to a waste container using the return tubing.

Embodiments of a portable kit for onsite adsorbent evaluation is disclosed. Embodiments of the kit may include an equipment case for enclosing and protecting contents of the kit therein during transportation and storage. Embodiments of the kit may further include source tubing configured for siphoning source water. Embodiments of the kit may further include return tubing for selectively returning treated water. Embodiments of the kit may further include a column configured for enclosing a candidate adsorbent for evaluation, receiving the source water from the source tubing, treating the source water with the candidate adsorbent and delivering treated water to the return tubing. Embodiments of the kit may further include a pump configured for drawing source water through, the source tubing, the column and the return tubing.

Embodiments of a method for onsite adsorbent evaluation at a source water site is disclosed. Embodiments of the method may include providing a portable onsite adsorbent evaluation system. Embodiments of the system provided according to the method embodiments may include an equipment case for enclosing the system and protecting contents of the system therein during transportation and storage. Embodiments of the system may further include source tubing configured for siphoning the source water into the system. Embodiments of the system may further include return tubing for selectively disposing treated water. Embodiments of the system may further include a column containing a candidate adsorbent for evaluation and configured for receiving the source water and sending the treated water. Embodiments of the system may further include a pump configured for drawing the source water through the column using the source tubing and disposing the treated water using the return tubing.

Embodiments of the method may further include placing an open end of the source tubing into the source water. Embodiments of the method may further include directing an open end of the return tubing to a treated water return. Embodiments of the method may further include connecting the system to a power source to power the pump. Embodiments of the method may further include selectively pumping the source water into the column at a preselected rate to achieve a preselected contact time with the candidate adsorbent and passing the treated water out of the column into the return tubing. Embodiments of the method may further include selectively gathering treated water samples. Embodiments of the method may further include disconnecting the system from the power source. Embodiments of the method may further include retrieving the source tubing and the return tubing. Embodiments of the method may further include evaluating the candidate adsorbent.

Additional features and advantages of the invention will be apparent from the detailed description which follows, taken in conjunction with the accompanying drawings, which together illustrate, by way of example, features of embodiments of the present invention.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION

Figure 1:
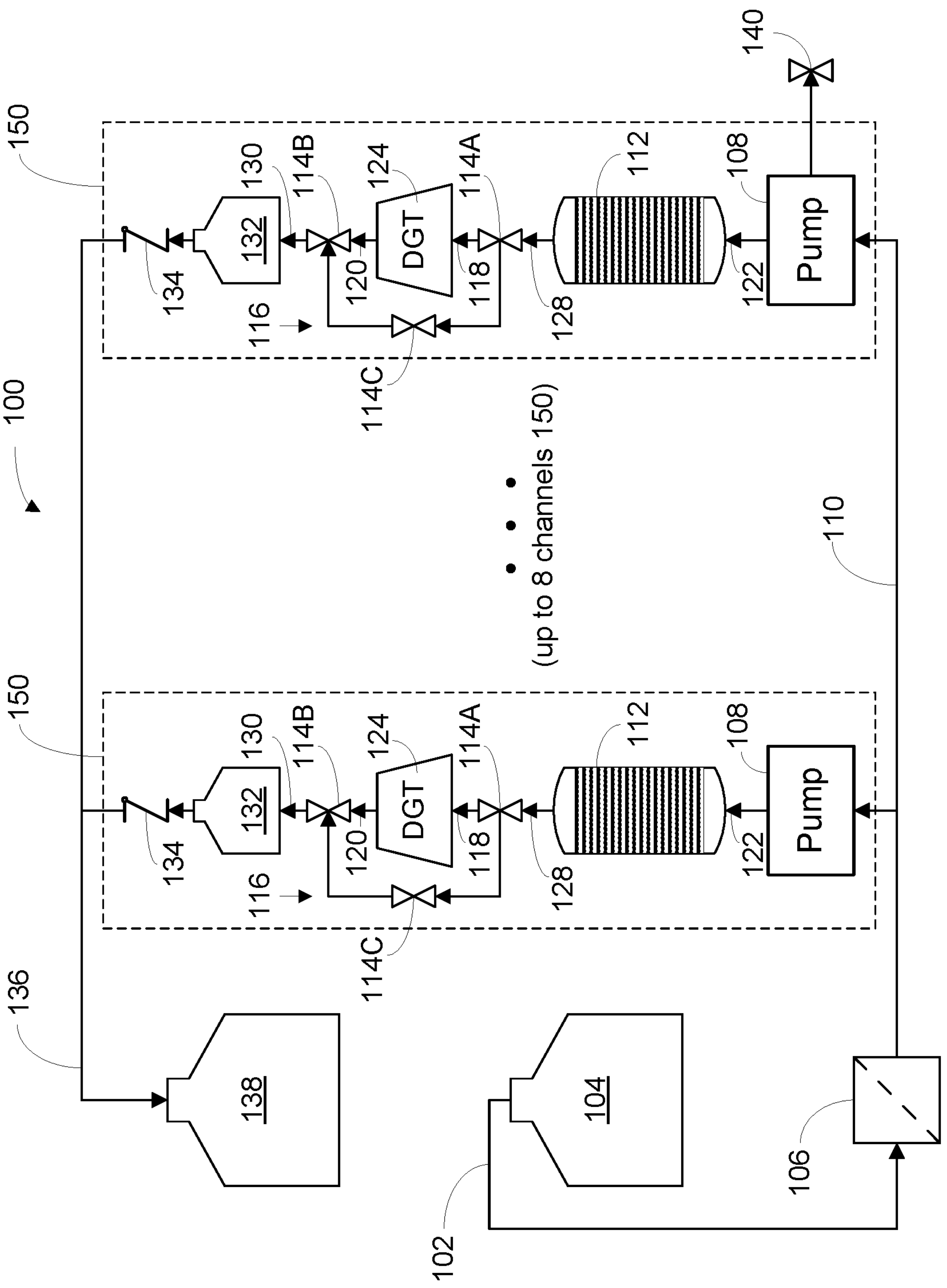
FIG. 1 is a flow diagram of an 8-channel embodiment of a portable rapid onsite adsorbent evaluation system, according to the present invention.

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless specifically otherwise stated.

Embodiments of the present invention include a portable adsorbent evaluation system configured for transportation and operation at a remediation site where access to contaminated water may be obtained directly via tubing and, according to various embodiments, only requires access to standard 120 VAC electricity for operation (though other embodiments may be battery powered), along with methods of operation and kits incorporating same. Embodiments of the present invention provide a capability generally only utilized in laboratory studies of adsorbent materials efficacy in a portable unit that may be used on-site at a remediation effort. Embodiments of the system integrate onboard pumps, fluid paths (tubing) and columns into a single heavy duty travel case, e.g., Pelican™ brand equipment case, for ease of transport. Embodiments of the system may include capacity for up to eight (8) different adsorbent materials to be tested simultaneously. Other features of the present invention may include interchangeable column holders and multiple column sizes that can be accommodated with simple change of fittings. Embodiments of the system may employ tubing to convey water to and from the unit. Embodiments of the system are designed to be serviceable in the field so that minor maintenance or troubleshooting may occur without the need to bring the system back to the laboratory for servicing. Embodiments of the system may further include weather-resistance, splash-proofing, or waterproofing to reduce problems encountered with liquid handling.

Embodiments of the system may be configured for ease of transport by a single person, i.e., packable. Embodiments of the present invention may be configured as a reusable evaluation system that can be setup at a laboratory prior to travel to a field site, or setup at a field site, for the rapid testing of adsorbents with actually contaminated water from the site of interest. By setting up the columns and adsorbents prior to site travel, the system can rapidly process samples by simply placing source tubing in the water source, the treated (return) water tubing at water return or discard and powering up the system. Embodiments of the system may employ multi-channel pumps, with each channel capable of independent flow operation. This allows for each column test to be tailored to the requirements for the specific column size and adsorbent media to be utilized. This multi-channel pump configuration further allows some compensation for different back-pressure from the columns and allows one or more channels to be taken out of service while still running experiments in the active columns.

According to a particular embodiment of the system, a central water source may be used from which each column has its own, dedicated line to ensure consistent flow speeds. A common feature of various embodiments of the system include an adaptable column testing area allowing for different columns to be used with a suitable mounting bracket. One particular embodiment of the system allows for both a column and separate passive sampler to be utilized for each flow channel. According to various embodiments of the system, sampling valves may be included after each column for users to collect samples at designated time intervals. According to other embodiments of the system, water exits the system through a single port that can be directed to a waste container or back into the on-site treatment system or reservoir as desired.

FIG. 1 is a flow diagram of an 8-channel embodiment of a portable rapid onsite adsorbent evaluation system 100, according to the present invention. System 100 may include up to eight independent sampling column channels, see, e.g., dashed box 150 with its associated components annotated. More particularly, system 100 may include source tubing 102 for drawing contaminated ground water 104 through a filter 106 to the pump intake tubing 110. Filter 106 removes bulk particles, and other undissolved substances from the contaminated ground water 104 prior to entering a sampling column channel, shown at dashed box 150. The water is drawn through the sampling column channel 150 by at least one pump 108 (up to eight as indicated by ellipses). After passing through the pump 108, the water is directed to intake port 122 of the column 112. Pump 108 may be any suitable pump for drawing fluid from a source and into a sampling column channel 150, e.g., and not by way of limitation, pump 108 may be a peristaltic pump. An exemplary pump 108 may be a single channel of a 4-channel peristaltic pump such as those shown FIGS. 2 and 3. Each pump 108 provides filtered contaminated water for introduction to an associated column 112 via a column intake port 122. System 100 may further include a drain valve 140 in fluid communication with the pump intake tubing 110 and at least one pump 108. An important feature of the present invention is the ability to independently adjust pressure and flow rate for any one of the fluid channels. This allows a variety of different adsorbents each having its own sampling regime to be tested simultaneously as well as the ability to independently service and sample each and every channel in the system via valves located between system components.

System 100 may further include a first valve 114A in fluid communication between an exit port 128 of a given column 112 and an intake port 118 of a passive sampler 124. An exemplary embodiment of a passive sampler 124 may be a diffusive gradients in thin films (DGT) passive sampler 124, e.g., and not by way of limitation, a DGT® brand passive sampler available from DGT® Research, Summer Cottage, Cockerham Road, Bay Horse, Lancaster LA2 0HF, Great Britain. A passive sampler is a device that accumulates dissolved substances in a controlled way. After analysis, the passive sampler provides the in situ concentration of the dissolved substance during the time of deployment. The passive sampler does not further treat the column treated water. Rather, it is sampling a small amount of the contaminant remaining in the column treated water in a known way such that the integrated concentration of the contaminant in the water during the passive sampler exposure time period can be back-calculated. Accordingly, water exiting a passive sampler holder may be referred to synonymously herein as "passive-sampled treated water", "passive-sampled water" or simply "sampled water."

It will be understood that any suitable type of passive sampler from any vendor configured for sampling any suitable dissolved species, trace element, metal, compound, chemical, toxin or pesticide for which there is a selective binding agent could be used with system 100. For example and not by way of limitation, passive sampler 124 may be a Chemcatcher® brand passive sampler (available from T.E Laboratories Ltd, Loughmartin Business Park, Tullow, Co. Carlow, Ireland), a microporous polyethylene tube (MPT) passive sampler, a peeper sampler, a polar organic chemical integrative sampler (POCIS), a semipermeable membrane device (SPMD), or a stabilized liquid membrane device (SLMD). It will be understood that one of ordinary skill in the art will be familiar with passive samplers and their applications. Accordingly, no further description of passive samplers and their use are provided herein.

Embodiments of a passive sampler 124 may further be in fluid communication a second valve 114B connected to the passive sampler 124 exit port 120. The illustrated embodiment of system 100 may further include a third valve 114 in between the first and second valves 114 along a bypass fluid path, shown generally at arrow 116. Second valve 114B may be in fluid communication 130 with an optional sampling vessel 132 via one-way valve 134.

An important feature of system 100 is the ability to sample treated water at multiple locations along the fluid path 150. For example, sampling may occur prior to treatment (source water sampling), after the treated water (effluent) has exited the column 112 only, or after the treated water has also exited the passive sampler 124. Casual observation of the embodiment of system 100 shown in FIG. 1 may imply that sampling only occurs along the fluid channel 150 after the passive sampler 124. However, because of the bypass fluid path 116, the effluent exiting from column 112 at exit port 128 may be sampled directly by selective valve (114A, 114B and 114C) settings. Alternatively, it will be understood that selective placement of 3-way valves and sample tubing allow for sampling at any of the valve locations 114A, 114B and 114C along fluid channel 150 shown in FIG. 1, according other embodiments of the present invention.

These treated water samples may be gathered at appropriate times during operation of the system 100, appropriately identified (labeled), stored in a sample container, refrigerated and transported back to a laboratory for analysis. In practice, adsorbent efficacy is measured indirectly. Rather than analyzing the adsorbent directly post-treatment, the treated water is time sampled for concentrations of the target contaminant to ascertain an indirect measure of the adsorbent's efficacy. Once the treated water concentration of the target contaminant reaches the same level as the source water over time, the adsorbent has become full (of the target contaminant), is no longer capable of adsorbing further contaminant and needs to be replaced.

Under this indirect measurement, it is assumed that the target contaminant is adsorbed by the adsorbent only and not in the tubing or other fluid channel structures of system 100. A method blank column, or first control, may be included in the sample measurements to confirm that the target contaminant is not adsorbed in the column glass, tubing and other fluid channel structures. The method blank column does not include sorbent but is still processed using the contaminated source (site) water to obtain a first control measurement. For the assumption to be true, the measured concentration of the contaminant in the effluent must be the same as that measured in the influent. Additionally, a second control sample may be taken with a column again including no sorbent but processed using deionized (DI) water to again confirm that effluent of clean DI water is the same as the influent DI water. These controls help ensure that contaminants are neither absorbed by nor leached from the materials or added to the water and the only difference between influent and treated water is the amount of contaminant sorbed by the sorbent material.

Referring again to the illustrated embodiment of system 100 in FIG. 1, fluid exiting the sampling vessel 132 may pass through a one-way valve 134 prior to fluid connection with return tubing 136 leading back to ground water return receptacle or waste container 138. It will be understood that the treated water exiting the return tubing 136 of system 100 is not returned to the original ground source water 104, but rather stored in a waste water container or otherwise disposed.

Figure 6:
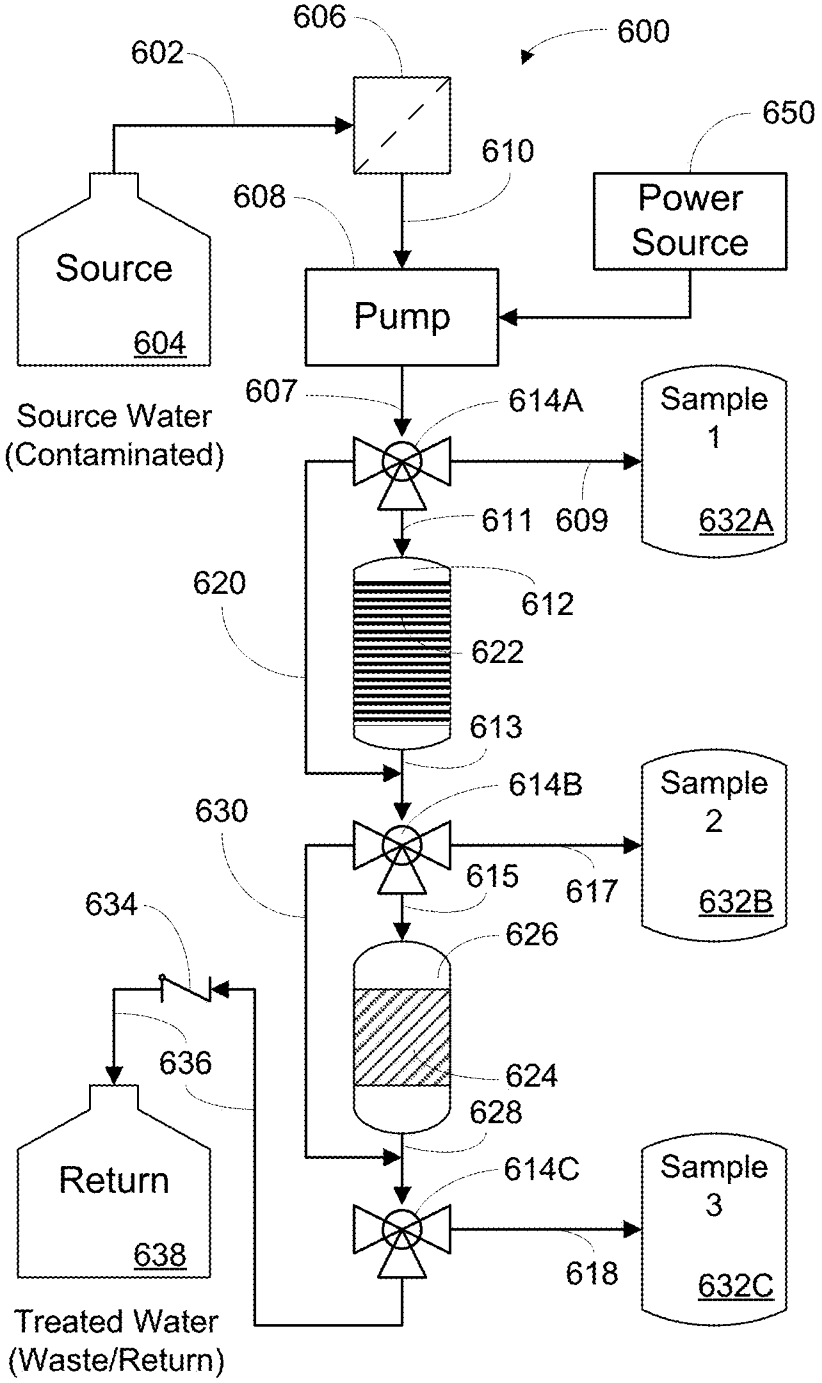
FIG. 6 is a single-channel embodiment of an onsite adsorbent evaluation system, according to the present invention.

FIG. 6 is a block diagram of a single-channel embodiment of an onsite adsorbent evaluation system 600, according to the present invention. It will be understood that fluid paths are illustrated as arrows between components of system 600 which may comprise tubing and associated tubing fittings at component entry and exit points. In FIG. 6 the tubing and fittings may not be explicitly illustrated for ease of illustration, but are implied. As shown in FIG. 6, pump 608 may be used to siphon contaminated source water 604 through a filter 606 via source tubing 602, pump intake path 610 through pump 608 and then deliver filtered source water 607 to valve 614A.

Pump 608 may be powered by a power source 650. Power source 650 may be any suitable electrical power source for example and not by way of limitation, a battery, 120 VAC external power via an extension cord, an intervening power supply connected to 120 VAC, or to 120 VAC via a power strip.

According to the illustrated embodiment, valve 614A may be a 3-way valve as illustrated in FIG. 6 with first sample fluid path 609 leading to a first sample vessel 632A. First sample vessel 632A may selectively be used to obtain a reference concentration of the filtered source water 607 prior to further treatment. Valve 614A may further selectively provide a column fluid path 611 into column 612 containing the adsorbent under evaluation 622 with column treated water 613 exiting the column 612 and directed to valve 614B. Valve 614A may further selectively provide a column bypass fluid path 620 around column 612 to provide filtered source water 607 to valve 614B located between column 612 and passive sampler 624. Alternatively, with selective settings on valve 614A, filtered source water 607 into column 612, column treated water 613 may exit column 612 and be directed into valve 614B. It will be understood that appropriate valving and fittings not shown at the junction between the column bypass fluid channel 620 and the column treated water 613 selectively allows one or the other fluid path to enter valve 614B and not enter back into column 612, or back up column bypass fluid channel 620.

Valve 614B may also be a 3-way valve as illustrated in FIG. 6 with a second sample path 617 leading to a second sample vessel 632B. Vessel 632B may be used to sample column treated water 613, or optionally sample filtered source water 607 depending on selective valve 614A settings. Valve 614B may further selectively provide a passive fluid sample input path 615 into passive sample container 624. Finally, valve 614B may further selectively provide a passive bypass fluid path 630 around passive sample container 682 and into valve 614C. Passive sample container 624 may be configured to hold a passive sampler 624 for sampling column treated water 613. Alternatively, the passive sample container 624 may be configured to hold a passive sampler 624 for time-integrated sampling of filtered source water 607 bypassing the column 612 via column bypass fluid path 620 and intervening valves 614A and 614B. Passive sampler 624 may be any suitable passive sampler including, e.g., the embodiments of a passive sampler 124 described herein.

Valve 614C may be any suitable 2-, or 3-way valve or stopcock (shown in FIG. 6) configured to receive passive-sampled treated water 628 from passive sample container 626, or column treated water 613 from column 612, or even filtered source water 607 depending on the configuration of intervening valves 614A and 614B. According to the illustrated embodiment, valve 614C may be used to direct passive-sampled treated water 628 into a third sample vessel 632C via third sample path 618. Third sample vessel 632C may also be used to obtain column treated water 613, column 613 and passive-sampled treated water 628, or even filtered source water 607 all depending on the selective application of valves 614A-614C. Valve 614C may also direct incoming effluent to a treated water return or waste container 638 using return tubing 636. According to an embodiment of system 600, a one-way or check valve 634 may be employed along the return tubing 636 path as shown to prevent backflow of treated water into system 600 via valve 614C.

Valves 614A-614C may be stopcocks with 2-, 3- and even 4-way configurations including manually operated levers and tubing fittings as needed for particular embodiments of system 600. According to other embodiments, valves 614A-614C may be electronically operated mechanical valves. Such plumbing valves 614A-614C and how they operate are well known to those of ordinary skill in the art and thus will not be further elaborated herein.

It will be understood that system 600 as illustrated in FIG. 6 provides significant flexibility to sample at various points along the desired water treatment path and to achieve single (i.e., column or passive-sampling) and/or multiple treatments (e.g., column and passive-sampling) along the same path if so desired. It will be further understood that particular embodiments of system 600 may remove unneeded fluid paths including bypass paths 620 and 630 where the particular application demands. It will be further understood that any one of the valves 614A-614C may be used as a system drain valve (with or without tubing as desired) to clear system 600 of source and treated water after use and prior to packing and transportation. It will be further understood that any one the outputs from any one of the valves 114A-114C and 614A-614C disclosed and shown herein may be further be used as a sampling tap for accessing fluid entering the valve 114A-114C and 614A-614C.

Figure 2:
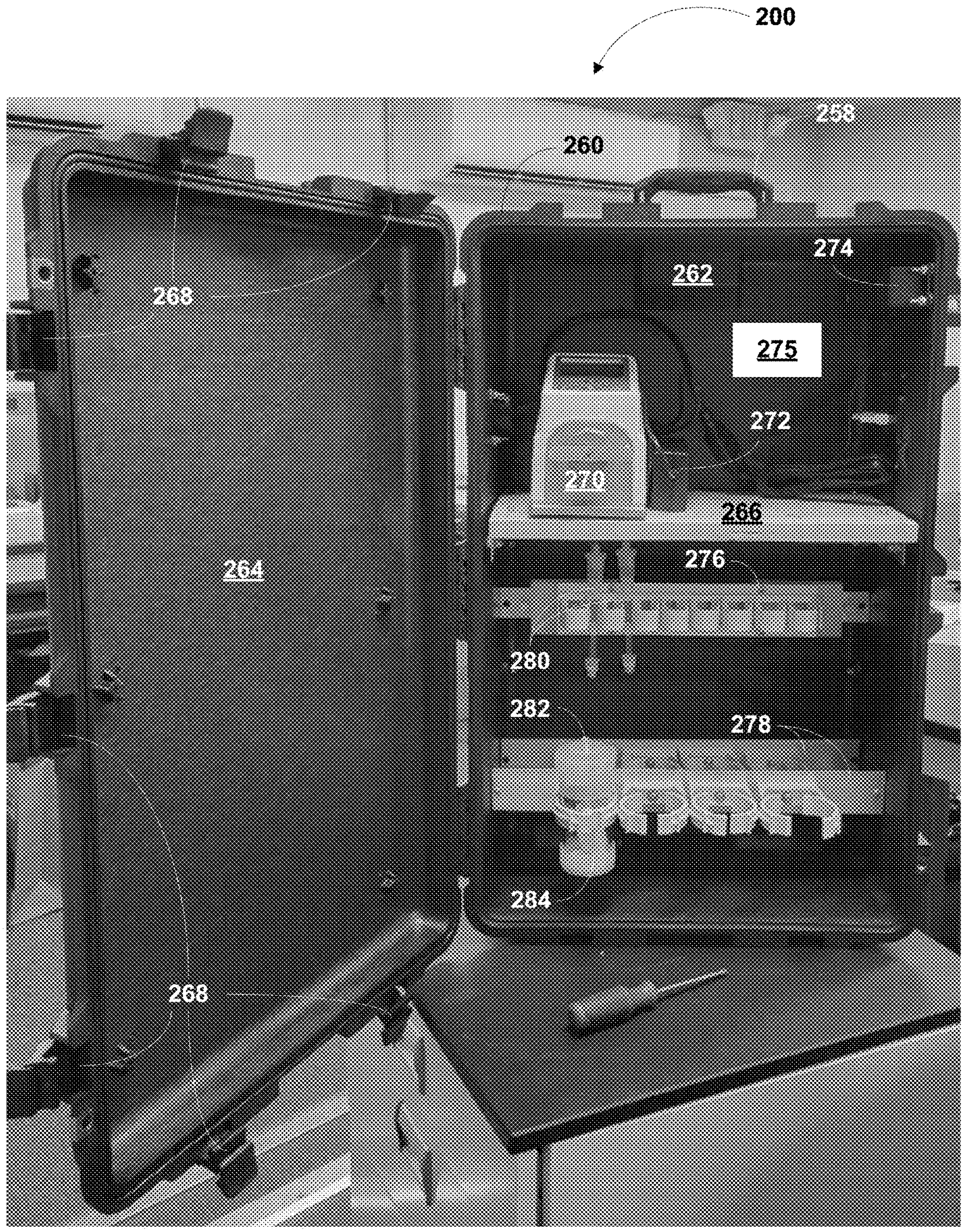
FIG. 2 is an image of an embodiment of a portable rapid onsite adsorbent evaluation system, according to the present invention.

FIG. 2 is an image of an embodiment of a portable rapid onsite adsorbent evaluation system 200, according to the present invention. System 200 may include an equipment case 260 configured for supporting and carrying components of a complete system 200. Case 260 may include a main compartment 262 with a hinged lid 264 that may be latched 268 (7 latches shown) to edges of the main compartment 262 for travel. System 200 may be configured with up to 8 channels of independent adsorbent sampling. However, for ease of component illustration, intermediary tubing and valving between major components have been removed to illustrate support structures within the main compartment 262.

The illustrated embodiment of system 200 shown in FIG. 2 may further include one or more shelves 266 (1 shown) within the equipment case 260 upon which one or more pumps 270 (one shown in FIG. 2) may rest. Equipment case 260 may further be configured with a handle 258 for ease of carrying. Pump 270 may also be mounted to shelf 266 or the main compartment 262 wall during sampling, storage or transportation of system 200, according to other embodiments. Shelf 266 may be selectively secured in place within the main compartment 262 with brackets as illustrated in FIG. 2, or adjustable according other embodiments of the present invention (not shown). The main compartment 262 may be configured to hold and store power supplies 272 (one shown in FIG. 2 resting on shelf 266) for powering the pump 270. The main compartment 262 may further be configured to hold and store a power strip 274 providing multiple 120 V alternating current (120 VAC) outlets for connection to power supplies 272 for powering pumps 270, or any other accessories (none shown) that need powering according to the user. Thus, system 200 may employ 120 VAC external power accessed from a generator or other external power source via connection through a power supply 272 directly, or the power strip 274 indirectly, and still further via an extension or power cord (not shown in FIG. 2, but see 230 in FIG. 3 and related discussion below), to power system 200.

According to an alternative embodiment of system 200, a battery, depicted by white rectangle 275, may be disposed within main compartment 262 as a source of power for system 200. It will be understood that other sources of power, e.g., solar panels, fuel cells, etc. may also be used as alternative power sources for system 200 consistent with the teachings of the present invention.

It will be understood that any suitable pump 270 may be used in system 200. The illustrated pump 270 shown in FIG. 2 may be a COLE-PALMER® ISMATEC® Reglo ICC 4-Channel, 8-Roller, peristaltic pump, Part No. HV-78001-80, available from Cole-Parmer Instrument Company, LLC, 625 Bunker Ct, Vernon Hills, IL 60061. The exemplary Reglo ICC pump is equipped with 4 independent pump fluid channels, each channel suitable for use as an independent pump 270 in system 200, according to the present invention. It will be understood that any suitable pump, peristaltic, piston or otherwise, may be used consistent with the teachings of the present invention. Thus, for a particular embodiments of the system, two Reglo ICC pumps 270 may be employed to provide fluid pumping for a full 8-channel system 300, see for example FIG. 3 and related discussion below. Of course, it will be understood that each fluid channel is independent of the others. Accordingly, two Reglo ICC pumps 270 may operate from 1 to 8 channels independently.

The illustrated embodiment of system 200 shown in FIG. 2 may further include a small-scale mounting bracket 276 selectively installed within the main compartment 262 and configured for supporting a plurality of small columns 280 (two shown in FIG. 2). The illustrated embodiment of system 200 shown in FIG. 2 may further include one or more full-scale mounting brackets 278 (two shown in FIG. 2) selectively installed within the main compartment 262 and configured for supporting a plurality of large columns (none shown in FIG. 2, but see 290 in FIG. 3) and/or passive sampler containers 282 with passive samplers 284 (one each shown in FIG. 2).

Figure 3:
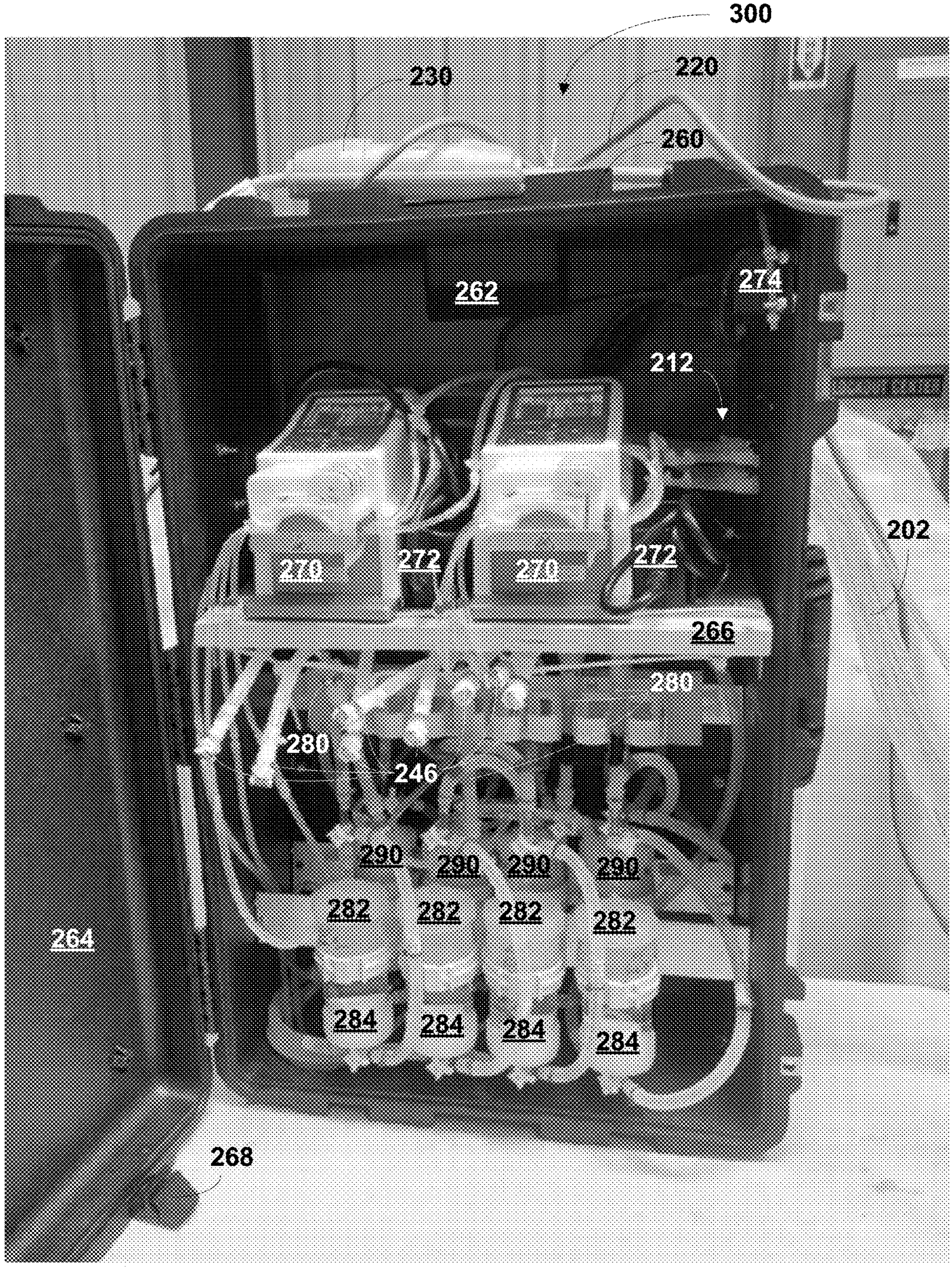
FIG. 3 is an image of a fully configured embodiment of a portable rapid onsite adsorbent evaluation system, according to the present invention.
Figure 4:
FIG. 4 illustrates a close-up view of the embodiment of a portable rapid onsite adsorbent evaluation system shown in FIG. 3.

FIG. 3 is an image of a fully configured embodiment of a portable rapid onsite adsorbent evaluation system 300, according to the present invention. FIG. 4 illustrates a close-up view of the embodiment of a portable rapid onsite adsorbent evaluation system 300 shown in FIG. 3, according to the present invention. As can be appreciated from FIG. 1, various configurations of system 300 are possible depending on the needs of the user. The particular embodiment of system 300 shown in perspective view, may include 4 small RSSCT columns 280, 4 large "full scale" columns 290 directly below the small RSSCT columns 280, which are the same size as the passive sampler containers 282 and are mounted behind the passive sampler containers 282. The large "full scale" columns 290 have adsorbent material like the columns 280, but the material is unground (i.e., the grain size as delivered from the manufacturer).

For the smaller RSSCT columns 280, the adsorbent material may be ground to create smaller particles and more surface area, which speeds up the chemical reaction that binds contaminant to the adsorbent. Because the smaller particles have increased surface area they provide more available binding sites and thus bind contaminants faster, resulting in sooner breakthrough, which is critical to understanding the performance of the sorbent over time. The faster adequate breakthrough is achieved, the sooner the column test can end. Accordingly, use of RSSCT columns speeds up the rate of testing.

The 4 larger columns 290 in back are for adsorbent testing and the 4 passive sampler containers 282 in front are holding the passive samplers 284. The passive sampler containers 282 are the same types of as those used for columns 290, but used for different purposes. The 4 RSSCT columns 280 are shown partially hidden underneath shelf 266 and behind intermediate taps 246. Source tubing 202 is shown to the right of equipment case 206. Source water input ports are shown generally at arrow 212. Return tubing is not visible in FIG. 3. However, return tubing is plumbed along inside back panel of the main compartment 262 of the equipment case 260. The yellow-taped tubes with white end caps are intermediate taps (ports) 246. The white end caps of the intermediate taps 246 have female quick-connect fittings so that they can be connected up to sampling bottles (vessels) with male fittings. The illustrated embodiment may include 3-way valves at the top (exit port) of each column so that water can be directed to either the ground (source) water return (not shown, but see 136, FIG. 1) or to these intermediate sampling ports 246. FIG. 3 further illustrates power cord 220 and ground fault isolator 230 in line with the power cord 220.

Embodiments of the system 100, 200, 300 and 600 according to the present invention allow for a complex laboratory study of adsorbents to be portable and deployable to field sites. This allows for direct testing of contaminated water at the site with candidate adsorbents. Embodiments of the system 100, 200, 300 and 600 according to the present invention provide more realistic evaluations of water treatment in an operational environment.

Some embodiments of the system 100, 200, 300 and 600 according to the present invention may be portably packaged such that only an external power source (120 VAC) and water tubing is required to perform the setup. Other embodiments may include rechargeable battery technology obviating the need for access to 120 VAC. The system can be setup in close proximity to existing treatment systems, pump stations, or groundwater sampling wells.

Embodiments of the system 100, 200, 300 and 600 according to the present invention are also reusable. Embodiments of the system 100, 200, 300 and 600 according to the present invention obviate the need for installing a semi-permanent pilot test system to characterize adsorbents. Such pilot test systems would generally be built in place near a treatment site. In contrast, embodiments of the system 100, 200, 300 and 600 according to the present invention are intended to be uninstalled and reused in other locations.

Another particularly useful feature of embodiments of the system 100, 200, 300 and 600 according to the present invention is the capability for concurrent testing of the column study and use of standard passive samplers in the same test/evaluation event channel.

Additional embodiments of the present invention may include custom pumps configured for the space and channel capacity requirements of a given portable equipment case with more efficient power and space utilization within the case. As noted elsewhere herein, additional embodiments of the present invention may further include various onboard power configurations that obviate the need for plugging into external 120 VAC power, e.g., solar and/or battery systems could be employed to make this a stand-alone experimental system that could be utilized without the need for pre-existing utilities or a generator. Additional embodiments of the present invention may further include automated sampling. By replacing the manual valves illustrated in the drawings, each channel flow path could be switched under computer control for automated time point collection. Additional embodiments of the present invention may further include integration of other passive sampler capabilities for simultaneous testing along each channel, not just the single passive samplers illustrated and described herein.

Although embodiments of the system 100 and 300 according to the present invention illustrated in the drawings may illustrate 8-channel portable onsite adsorbent evaluation systems, it will be understood that many configurations and variants are possible. For example, fewer than 8, or greater than 8 channels may be employed depending on the particular embodiment and application. Similarly, any number of passive sampler containers with passive samplers may be used independently or in conjunction with columns in their associated channels according to other embodiments.

Figure 5:
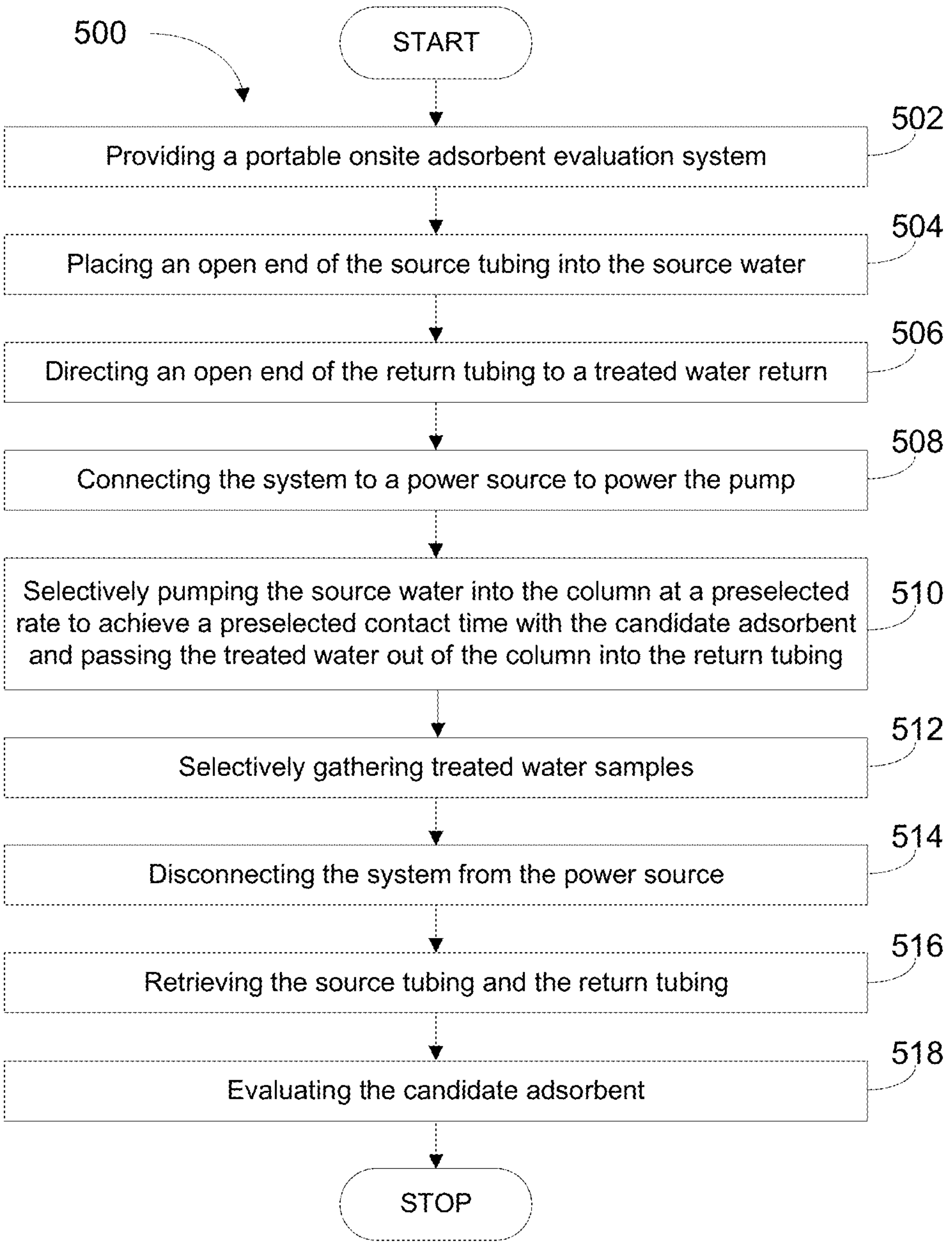
FIG. 5 is a flowchart of an embodiment of a method for rapid onsite adsorbent evaluation at a source water site, according to the present invention.

Referring now to FIG. 5, a flowchart of an embodiment of a method 500 for onsite adsorbent evaluation at a source water site is illustrated. Method 500 may include providing 502 a portable onsite adsorbent evaluation system. Particular embodiments of a portable rapid onsite adsorbent evaluation system may be any one of systems 100, 200, 300 and 600 described herein and illustrated in the drawing FIGS. One particular system embodiment may include an equipment case for enclosing the system and protecting contents of the system therein during transportation and storage, source tubing configured for siphoning the source water into the system, return tubing for selectively disposing treated water, a column containing a candidate adsorbent for evaluation and configured for receiving the source water and a pump configured for drawing source water through the column using the source tubing and disposing the treated water using the return tubing, each as disclosed herein.

Method 500 may further include placing 502 an open end of the source tubing into the source water. It will be understood that the length of the source tubing and the diameter of the source tubing bore may be any dimensions suitable for drawing source water at one end and directing the source water into the system inlet plumbing, e.g., filter 106 (FIG. 1) at the other end. Method 500 may further include directing 506 an open end of the return tubing to a treated water return. It will be understood that treated water exiting the system is not being recycled back to the source water for the purposes of this invention. Rather the treated water is typically disposed or directed to a ground water return vessel (see, e.g., 138, FIG. 1) and then disposed. It will be further understood that the length of the return tubing and return tubing bore may be any dimensions suitable for interfacing with the system plumbing to direct treated water once it has been processed through the system.

Method 500 may further include connecting 508 the system to a power source to power the pump. The power source may be external 120 VAC or a battery according to a couple embodiments. The power source may further include a power supply, power strip and/or extension cord, according to other embodiments of method 500. The particular type of power source is not a critical feature of the invention, only that it be capable of powering the pump(s) used in the system. Method 500 may further include selectively pumping 510 the source water into the column at a preselected rate to achieve a preselected contact time with the candidate adsorbent and passing the treated water out of the column into the return tubing. It will be understood that according to other embodiments of method 500, there may be multiple pumps with multiple channels, each channel independent of other channels. A particularly useful feature of the present invention is the capability to draw the source water at whatever rate the selected sorbent needs to be in contact (known as the empty bed contact time) with the source water to optimally remove the target contaminant. Because of the independent channels, each with their own programmable pump, the method 500 and systems 100, 200, 300 and 600 of the present invention provide extraordinary flexibility to allow each column to experience water flow rates, independent of the other columns. This provides test capability for adsorbents having different contact times simultaneously. Effluent from each of the multiple independent channels may then be fed into the return tubing.

Method 500 may further include selectively gathering 512 treated water samples from source water having passed through the column. Gathering 512 samples may be performed at different time intervals, for example and not by way of limitation, collecting one sample every 3-5 days. Collecting each sample may take 30-90 minutes depending on flow speed and amount of sampled (treated) water collected. Sample sizes, for example and not by way of limitation, may range from 250 mL to 1 L depending on laboratory requirements. The samples may also be stored, typically in high-density polyethylene (HDPE) bottles, or in containers of other materials depending on the type of contaminant in study, and refrigerated separate from the system for subsequent transport and laboratory analysis. The sampling regime depends on the sorbent under evaluation. Sampling increments are typically based on water volume passed through columns, and are typically collected more frequently at the beginning of the experiment to capture compounds that break through immediately. According to a particular embodiment of method 500, selective gathering 512 of the treated water samples may further include refrigerating or otherwise storing the selectively gathered treated water samples and transporting the selectively gathered treated water samples to a laboratory for analysis.

Method 500 may further include disconnecting 514 the system from the power source. According to various embodiments, disconnecting 514 the system from the power source may be achieved by switching off power to the system, and/or unplugging the system from the power source, or any combination thereof. Method 500 may further include retrieving 516 the source tubing and the return tubing. Once retrieved the source and return tubing may be stowed separately from or within the equipment case according to various embodiments. At this point the system may be packed up and taken back to the laboratory or setup for another sampling session anywhere the system may be transported.

Finally, method 500 may further include evaluating 518 the candidate adsorbent. The sorbent characteristics of interest during candidate adsorbent evaluation 518 may include sorbent capacity and break through rate among other parameters. So, for example with the contaminant PFAS, the system provides the samples that can determine how much PFAS can be bound to the sorbent and how quickly enough PFAS makes it through the column such that it needs to be replaced, i.e., the sorbent is used up to its capacity. It will be understood that the analysis of the samples and the adsorbent evaluation, e.g., the determination of the sorbent characteristics of interest, are performed in a laboratory according to conventional procedures. The system and method embodiments herein focus on solving the pervasive technical problem of obtaining accurate and representative treated water samples onsite quickly for subsequent laboratory analysis. Accordingly, it will be understood that the technical procedures for performing the evaluation 518 of the candidate adsorbent are well known to those of ordinary skill in the art and thus, will not be further elaborated herein.

Having described particular embodiments of portable onsite adsorbent evaluation systems and methods for sampling source water containing a target contaminant with reference to the drawings, additional generic embodiments of the invention follow. An embodiment of a portable onsite adsorbent evaluation system for sampling source water containing a target contaminant is disclosed. The system may include an equipment case for enclosing the system and protecting contents of the system therein during transportation and storage. The system may further include source tubing configured for siphoning the source water onsite into a fluid channel in the system. The system may further include a column disposed within the fluid channel and configured to receive the source water, the column configured with a candidate adsorbent, the candidate adsorbent configured for adsorbing the target contaminant from the source water to obtain column treated water. The system may further include a valve configured for selectively directing the column treated water to a sampling vessel. The system may further include return tubing along the fluid channel for selectively returning column treated source water to a waste container. The system may further include a pump configured for drawing the source water through the fluid channel beginning from source tubing and delivering column treated water to a waste container using the return tubing.

Another embodiment of a portable onsite adsorbent evaluation system for sampling source water containing a target contaminant may further include a power cord configured for powering the pump from an external power source. Yet another embodiment of the system may further include a power supply for powering the pump from an external power source. Still another embodiment of the system may further include a power strip configured for powering the pump from an external power source. Still yet another embodiment of the system may further include a battery configured for powering the pump.

Various embodiments of a portable onsite adsorbent evaluation system for sampling source water containing a target contaminant may further include a filter between the source tubing and the pump configured to remove bulk particles and debris from the source water and delivering filtered source water to the column. Various embodiments of the system may further include a passive sampler container containing a passive sampler, the passive sampler container disposed along the fluid channel and configured to deliver passive treated water. Various embodiments of the system may further include a bypass fluid path around the passive sampler container. Various embodiments of the system may further include a sampling tap along the fluid path. The sampling tap may, e.g., and not by way of limitation, be an exit port from a valve 114A-114C or 614A-614C with or without appropriate tubing and fittings.

Various embodiments of a portable onsite adsorbent evaluation system for sampling source water containing a target contaminant may further include selectively removable mounting brackets mounted within the equipment case and configured for supporting different sizes of passive sampler containers. Embodiments of mounting brackets may include small 276 or large 278 scale mounting brackets or any suitably sized mounting bracket configured to support columns or passive sampler containers.

According to particular embodiments of the system, the column may be at least one Rapid Small-Scale Column Test (RSSCT) or full-scale column. Various embodiments of the system may further include a small-scale or full-scale mounting bracket configured for mounting within the equipment case and configured for supporting the at least one RSSCT or full-scale column, respectively.

Embodiments of a portable kit for onsite adsorbent evaluation is disclosed. Embodiments of the kit may include an equipment case for enclosing and protecting contents of the kit therein during transportation and storage. Embodiments of the kit may further include source tubing configured for siphoning source water. Embodiments of the kit may further include return tubing for selectively returning treated water. Embodiments of the kit may further include a column configured for enclosing a candidate adsorbent for evaluation, receiving the source water from the source tubing, treating the source water with the candidate adsorbent and delivering treated water to the return tubing. Embodiments of the kit may further include a pump configured for drawing source water through, the source tubing, the column and the return tubing.

Embodiments of a portable kit for onsite adsorbent evaluation may further include at least one of: a power cord, a power supply and a power strip, each configured for powering the pump from an external power source. Embodiments of a portable kit may further include a battery configured for powering the pump. Embodiments of a portable kit may further include a filter between the source tubing and the pump configured to remove bulk particles and debris from the source water prior to reaching the column. Embodiments of a portable kit may further include a passive sampler container containing a passive sampler, the passive sampler container configured for treating the source water. Embodiments of a portable kit may further include a bypass fluid path around the passive sampler container. Embodiments of a portable kit may further include a sampling tap for sampling the treated water. Embodiments of a portable kit may further include selectively removable mounting brackets configured for mounting within the equipment case and configured for supporting different sizes of the passive sampler container. Embodiments of a portable kit may further include at least one RSSCT (small-scale) or full-scale column. Embodiments of a portable kit may further include selectively removable small- or full-scale mounting brackets configured for mounting within the equipment case and configured for supporting the at least one RSSCT or full-scale column, respectively.

Embodiments of a method for onsite adsorbent evaluation at a source water site is disclosed. Embodiments of the method may include providing a portable onsite adsorbent evaluation system. Embodiments of the system provided according to the method embodiments may include an equipment case for enclosing the system and protecting contents of the system therein during transportation and storage. Embodiments of the system may further include source tubing configured for siphoning the source water into the system. Embodiments of the system may further include return tubing for selectively disposing treated water. Embodiments of the system may further include a column containing a candidate adsorbent for evaluation and configured for receiving the source water and sending the treated water. Embodiments of the system may further include a pump configured for drawing the source water through the column using the source tubing and disposing the treated water using the return tubing.

Embodiments of the method may further include placing an open end of the source tubing into the source water. Embodiments of the method may further include directing an open end of the return tubing to a treated water return. Embodiments of the method may further include connecting the system to a power source to power the pump. Embodiments of the method may further include selectively pumping the source water into the column at a preselected rate to achieve a preselected contact time with the candidate adsorbent and passing the treated water out of the column into the return tubing. Embodiments of the method may further include selectively gathering treated water samples. Embodiments of the method may further include disconnecting the system from the power source. Embodiments of the method may further include retrieving the source tubing and the return tubing. Embodiments of the method may further include evaluating the candidate adsorbent. According to other methods for onsite adsorbent evaluation at a source water site, selective gathering of the treated water samples may further include refrigerating or storing the selectively gathered treated water samples and transporting the selectively gathered treated water samples to a laboratory for analysis.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed.

From the above description of the embodiments of a portable rapid onsite adsorbent evaluation system, method and kit, it is manifest that various alternative structures may be used for implementing features of the present invention without departing from the scope of the claims. The described embodiments are to be considered in all respects as illustrative and not restrictive. It will further be understood that the present invention may suitably comprise, consist of, or consist essentially of the component parts, method steps and limitations disclosed herein. The method and/or apparatus disclosed herein may be practiced in the absence of any element that is not specifically claimed and/or disclosed herein.

While the foregoing advantages of the present invention are manifested in the detailed description and illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A portable on-site adsorbent evaluation system for sampling source water containing a target contaminant, the portable on-site adsorbent evaluation system comprising:
- an equipment case enclosing equipment comprising:
  - a fluid channel;
  - a source tube including a source tube open end and configured to convey water from the source water into the fluid channel;
  - a column comprising a column inlet, a column outlet and a candidate adsorbent configured to adsorb the target contaminant, the column inlet in fluidic communication with the fluid channel and configured to treat the conveyed water and provide column treated water to the column outlet;
  - a valve configured to selectively direct the column treated water to a sampling vessel;
  - a return tube including a return tube open end, the return tube in fluidic communication with the column outlet and configured to selectively direct the column treated water to a waste container;
  - a passive sampler container comprising a container inlet, a container outlet and a passive sampler, the container inlet in fluidic communication with the fluid channel and the passive sampler configured to provide water sampled by the passive sampler to the container outlet; and
  - a pump configured to pump the conveyed water from the source water through the source tube and the fluid channel and to pump the column treated water through the return tube to the waste container;
- wherein the equipment case is configured to enclose and protect the system contents during transportation and storage.

2. The portable on-site adsorbent evaluation system according to claim 1, further comprising a power cord configured for to transfer electrical energy from an external power source to the pump.

3. The portable on-site adsorbent evaluation system according to claim 1, further comprising a power supply configured to power the pump.

4. The portable on-site adsorbent evaluation system according to claim 1, further comprising a power strip configured to transfer electrical energy from an external power source to the pump.

5. The portable on-site adsorbent evaluation system according to claim 1, further comprising a battery configured to power the pump.

6. The portable on-site adsorbent evaluation system according to claim 1, further comprising a filter disposed between the source tube and the pump and configured to filter bulk particles and debris out of the conveyed water.

7. The portable on-site adsorbent evaluation system according to claim 1, further comprising a bypass fluid path around the passive sampler container.

8. The portable on-site adsorbent evaluation system according to claim 1, further comprising a sampling tap in fluidic communication with the fluid path.

9. The portable on-site adsorbent evaluation system according to claim 1, further comprising a plurality of selectively removable mounting brackets mounted within the equipment case and configured to support the passive sampler container.

10. The portable on-site adsorbent evaluation system according to claim 1, wherein the column further comprises at least one of:
- a Rapid Small-Scale Column Test (RSSCT); and
- a full-scale column.

11. The portable on-site adsorbent evaluation system according to claim 10, further comprising one or more mounting brackets configured to mount to the equipment case and support the Rapid Small-Scale Column Test (RSSCT) or the full-scale column or both.

12. A portable kit for evaluating an adsorbent at a source water site, the portable kit comprising:
- an equipment case enclosing kit contents comprising:
  - a fluid channel;
  - a source tube including a source tube open end and configured to convey water from the source water into the fluid channel;
  - a column comprising a column inlet, a column outlet and a candidate adsorbent configured to adsorb the target contaminant, the column inlet configured to fluidic communicate with the fluid channel when the kit is assembled and configured to treat the conveyed water and provide column treated water to the column outlet;
  - a valve configured to selectively direct the column treated water to a sampling vessel;
  - a return tube including a return tube open end, the return tube configured to fluidically communicate with the column outlet when the kit is assembled and configured to selectively direct the column treated water to a waste container;
  - a passive sampler container comprising a container inlet, a container outlet and a passive sampler, the container inlet configured to fluidic communicate with the fluid channel when the kit is assembled and the passive sampler configured to provide water sampled by the passive sampler to the container outlet; and a pump configured to pump the water from the source water through the source tube and the fluid channel and to pump the column treated water through the return tube to the waste container; wherein the equipment case is configured to enclose and protect the kit contents during transportation and storage.

13. The portable kit according to claim 12, further comprising at least one of: a power cord configured to transfer electrical energy from an external power source to the pump, a power supply configured to power the pump and a power strip configured to transfer electrical energy from the external power source to the pump.

14. The portable kit according to claim 12, further comprising a battery configured to power the pump.

15. The portable kit according to claim 12, further comprising a filter between the source tubing and the pump, the filter configured to remove bulk particles and debris from conveyed water before the conveyed water enters the column.

16. The portable kit according to claim 12, further comprising a bypass fluid path around the passive sampler container.

17. The portable kit according to claim 12, further comprising a sampling tap for sampling the column treated water.

18. The portable kit according to claim 15, further comprising selectively removable mounting brackets configured to mount within the equipment case and support the passive sampler container.

19. The portable kit according to claim 12, wherein the column further comprises at least one of:

a Rapid Small-Scale Column Test (RSSCT); and a full-scale column.

20. The portable kit according to claim 19, further comprising one or more selectively removable mounting brackets configured to mount within the equipment case and support the Rapid Small-Scale Column Test (RSSCT) or the full-scale column or both.

21. A method of evaluating a candidate absorbent at a source water site using the portable on-site adsorbent evaluation system of claim 1, the method comprising:

placing the source tube open end into the source water;

directing the return tube open end to a treated water return;

powering the pump by connecting the portable on-site adsorbent evaluation system to a power source;

enabling a preselected contact time with the candidate adsorbent by selectively pumping water from the source water into the column at a preselected rate and directing the treated water out of the column outlet and into the return tube;

selectively gathering treated water samples;

disconnecting the portable on-site adsorbent evaluation system from the power source;

retrieving the source tube and the return tube; and evaluating the candidate adsorbent at the source water site.

22. The method according to claim 21, wherein the selectively gathering treated water samples comprises:

refrigerating or storing the selectively gathered treated water samples;

transporting the selectively gathered treated water samples to a laboratory; and analyzing the selectively gathered treated water samples at the laboratory.

* * * * *